US011418623B2

(12) United States Patent
Fong et al.

(10) Patent No.: US 11,418,623 B2
(45) Date of Patent: Aug. 16, 2022

(54) HOME-SMARTMEDIA-MEC WITH CLOUD MARKETPLACE

(71) Applicant: EMC IP Holding Company LLC, Hopkinton, MA (US)

(72) Inventors: Victor Fong, Medford, MA (US); Malini Bhattacharjee, Hopkinton, MA (US); Amy Seibel, Cambridge, MA (US); Xuebin He, Westwood, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/104,524

(22) Filed: Nov. 25, 2020

(65) Prior Publication Data

US 2022/0166851 A1   May 26, 2022

(51) Int. Cl.
| | |
|---|---|
| *H04L 67/00* | (2022.01) |
| *G16Y 10/75* | (2020.01) |
| *H04L 67/125* | (2022.01) |
| *G08B 25/10* | (2006.01) |
| *G16Y 20/20* | (2020.01) |
| *G16Y 40/35* | (2020.01) |
| *G16Y 10/80* | (2020.01) |

(52) U.S. Cl.
CPC .............. *H04L 67/34* (2013.01); *G08B 25/10* (2013.01); *G16Y 10/75* (2020.01); *G16Y 10/80* (2020.01); *G16Y 20/20* (2020.01); *G16Y 40/35* (2020.01); *H04L 67/125* (2013.01)

(58) Field of Classification Search
CPC ........ H04L 67/34; G16Y 10/75; G16Y 10/80; G16Y 20/20; G08B 25/10

USPC ......................................................... 709/222
See application file for complete search history.

(56) References Cited

U.S. PATENT DOCUMENTS

| | | | | |
|---|---|---|---|---|
| 5,485,505 | A * | 1/1996 | Norman ................ | H04W 8/265 379/189 |
| 9,264,783 | B2 * | 2/2016 | O'Callaghan .... | H04N 21/41407 |
| 10,476,960 | B1 * | 11/2019 | Rao ...................... | H04L 67/1097 |
| 11,080,336 | B2 * | 8/2021 | Van Dusen ............ | G06Q 50/01 |
| 11,165,750 | B1 * | 11/2021 | H R ..................... | H04L 63/0209 |
| 2003/0172141 | A1 * | 9/2003 | Miller, II ............ | H04L 41/0806 707/999.01 |
| 2014/0269724 | A1 * | 9/2014 | Mehler ................... | H04L 45/30 370/392 |
| 2015/0379420 | A1 * | 12/2015 | Basak ..................... | G06F 16/11 706/12 |
| 2016/0080172 | A1 * | 3/2016 | Uberoy ............... | H04L 12/4641 370/254 |
| 2016/0125489 | A1 * | 5/2016 | Gupte ................. | H04L 67/2833 705/26.61 |

(Continued)

*Primary Examiner* — Tauqir Hussain
(74) *Attorney, Agent, or Firm* — Workman Nydegger

(57) ABSTRACT

One example method includes configuring an input device based in part on a type of network with which the input device is expected to be used, configuring an output device based in part on a type of network with which the output device is expected to be used, registering the input device and the output device with an orchestrator, downloading a service needed to process a data stream generated by the input device, configuring an execution pipeline, and the execution pipeline includes the service, receiving the data stream from the input device and processing the data stream with the execution pipeline, and transmitting information relating to the processed data stream to the output device.

20 Claims, 3 Drawing Sheets

(56) References Cited

U.S. PATENT DOCUMENTS

| | | | |
|---|---|---|---|
| 2017/0235507 A1* | 8/2017 | Sinha | H04L 67/1095 |
| | | | 711/114 |
| 2019/0230025 A1* | 7/2019 | Kommula | H04L 41/0893 |
| 2019/0342388 A1* | 11/2019 | Rao | H04L 67/1097 |
| 2020/0220736 A1* | 7/2020 | Subramanian | G09C 1/00 |
| 2021/0224233 A1* | 7/2021 | Bafna | G06F 21/6218 |
| 2021/0243119 A1* | 8/2021 | Shah | H04L 45/02 |

* cited by examiner

HOME-SMARTMEDIA-MEC WITH CLOUD MARKETPLACE

FIELD OF THE INVENTION

Embodiments of the present invention generally relate to multi-access edge computing. More particularly, at least some embodiments of the invention relate to systems, hardware, software, computer-readable media, and methods for a private multi-access edge computing (MEC) service platform that may be operable to address smart multimedia needs at various entities.

BACKGROUND

Advances in communications such as 5G networks, device-to-device (D2D) direct communication, and MEC, may enable the provision of a variety of services and media to consumers, including media susceptible to AI (artificial intelligence) based processing. Such media is sometimes referred to as 'smart media.' At present, smart media may be delivered by way of two different architectures, one of which is user equipment based, and the other of which is cloud based. Each of these delivery architectures has proven problematic however.

With respect to a user equipment based delivery architecture for media, significant effort is typically required to develop user equipment, both hardware and software, in order to provide custom solutions for media delivery and consumption. For example, if a security camera is to be enabled to gather data and then analyze the data to determine the intent of actors whose actions are captured by the security camera, a custom AI chip with that analysis functionality would have to be created, and then embedded in the security camera. This can be a long, and relatively expensive, process.

Regarding a cloud based delivery architecture for media, the media stream typically has to be streamed to cloud services, processed, and then sent back to the edge computing environment where the consumer is located. This approach may cause significant delays. Moreover, as the delay results from internet network latency and the processing speed of cloud services, the occurrence and length of delay is largely beyond user control. Not only does this delay in response negatively impact the user experience, but for critical use cases when time is of the essence, such as in the case of an emergency for example, such a delay is unacceptable.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
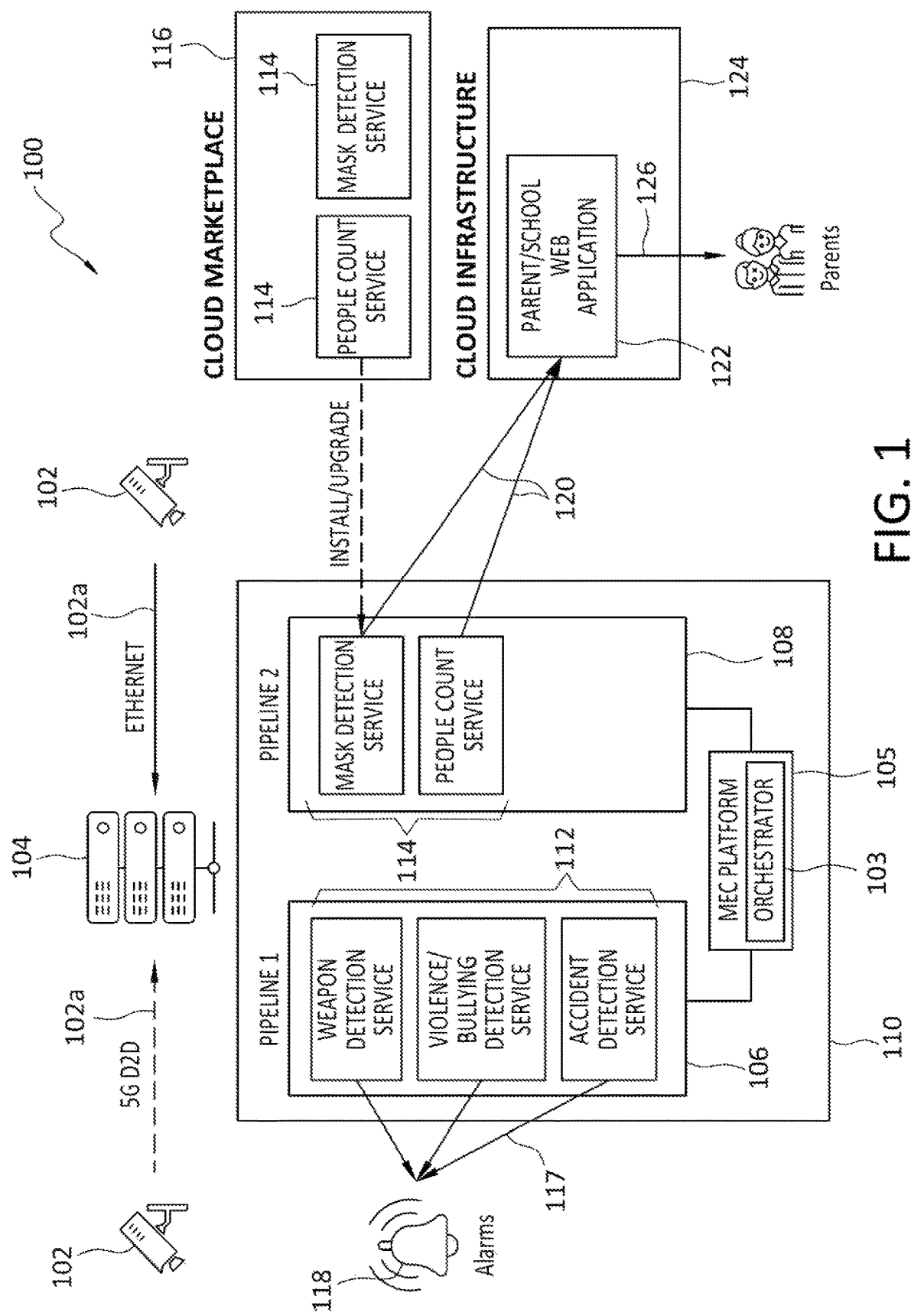
FIG. 1 discloses aspects of an example operating environment and architecture.

Embodiments of the present invention generally relate to multi-access edge computing. More particularly, at least some embodiments of the invention relate to systems, hardware, software, computer-readable media, and methods for a private multi-access edge computing (MEC) service platform that may be operable to address smart multimedia needs at various entities.

Implementation of the 5G cellular communications standard may enable device-to-device (D2D) direct communication along with multi-access edge computing (MEC). Individual homes and private organizations may be able to utilize this new technology to offer a new user experience. Thus, this disclosure embraces, among other things, a private MEC service platform, that can be packaged both as a software-defined solution or bundled in an appliance, to address smart multi-media needs at private homes or organizations, such as schools, hospitals, government, for example.

In more detail, some example embodiments provide for a home 5G D2D and MEC platform, as well as a cloud marketplace that can offer smart media services to home and private institutions. Some embodiments employ two primary components, one of which is a cloud marketplace where contributors can share their smart services and users can purchase/download the smart service. The other component employed in some embodiments is an orchestrator, which may comprise an MEC platform that may discover devices in a private network, download the smart services from the cloud marketplace, and then deploy those services in pipeline at the customer site.

Thus, embodiments of the invention may enable users to obtain a customized multi-media experience through use of the cloud marketplace to obtain a mix of services. This customized experience may be obtained without requiring modification of user devices to include AI chips and other service-specific hardware. As well, some embodiments may reduce or eliminate the latency associated with cloud based processing of user media stream by processing those media streams, in part or in whole, at edge locations where the user devices that generate the media are located. Embodiments of the invention may additionally, or alternatively, include various other useful functionalities, examples of which are disclosed elsewhere herein.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are disclosed elsewhere herein. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

A. Overview

As noted earlier, Implementation of the 5G cellular communications standard may enable device-to-device (D2D) direct communication along with multi-access edge computing (MEC). Individual homes and private organizations may be able to utilize this new technology to offer a new user experience. Multi-media systems and devices that implement AI processing and other AI functionalities may be referred to herein as 'smart media.' Smart media may be employed in connection with various embodiments of the invention.

Some examples of smart media, some or all of which may include AI functionality, are: a baby monitor detecting whether a baby is choking during a nap; a security camera detecting whether a stranger is breaking in, or a child is being bullied at school; a patient camera detecting whether a patient has fallen on the ground; a monitor to detect when TVs or streaming devices are playing inappropriate content; a TV detecting that news channels are reporting non-factual material; and, the customization of actors and costumes for movies and TV shows.

With respect to AI functionality, a smart media device such as the example baby monitor mentioned above may not only record data, such as the actions of the baby, but may, using AI functionality, also draw inferences and conclusions based on the gathered data. Thus, a smart media baby monitor may detect choking sounds, and also determine, based on those sounds, that the child is in difficulty and needs help. Thus, a smart media device may not merely record data, but may also process the data in a useful way, and then notify a consumer concerning the data and conclusions generated. Advantageously, such processing by smart media may be performed in an edge environment, such as in the home of a user for example, thereby reducing latency and timely providing needed information and conclusions to the user of the smart media.

B. Overview

A variety of technical challenges may be addressed by one or more of the disclosed embodiments. Examples of the these are outlined below. This discussion is not intended to limit the scope of the invention in any way.

One such challenge relates to the fact that, conventionally, user equipment customization requires significant cost and effort to design, implement, and use, thereby increasing the cost to the end user. In order for user equipment to implement special AI-based functionality, special design, development, integration and packaging would need to be custom designed for each different user equipment product, such as baby monitors, security camera, and TVs, for example. This cost would ultimately be absorbed by consumers, causing smart media to be too expensive for some users.

Another example challenge that may be resolved by one or more embodiments concerns the difficulty in utilizing standard input and output devices. Particularly, the smart services that AIML (Artificial Intelligence/Machine Learning) workloads execute on are typically tightly coupled with the user equipment. That is, the user equipment may be specifically configured to perform those workloads. Thus, for example, if a video camera does not have AI facial detection, it may be difficult or impossible for users to add that desired functionality in the data path of the video camera so that when data is gathered by the video camera, that data can be analyzed with the facial detection functionality.

A further challenge that may be addressed by some example embodiments concerns difficulties in upgrading an existing smart service. For example, no open standard has been adopted to update/upgrade the middleware/software of a smart device. Even though a lot of smart devices can follow popular protocols used by AI assistants, such as Amazon Alexa for example, it is generally not possible to upgrade the device itself with such AI assistants. As an end user, the smart device must upgrade manually by downloading a certain app or zip file. Some smart devices may not even provide such upgrade options at all due to their highly integrated design.

Still another challenge to which some embodiments may be directed concerns the difficulties typically encountered in offering by a merchant, and obtaining by a user, new smart services. For example, when a service provider develops a new smart service, the go-to-market path is often not easy, as most solutions need to be tightly coupled with hardware products. Moreover, software-defined smart services are lacking a standardized marketplace. On the other hand, users cannot gain access to these software-defined smart services without paying a high cost to obtain new user equipment configured specifically to implement that service.

Another challenge that may be resolved by some embodiments concerns the response delay that is typical of cloud-based approaches. In particular, one of the biggest draws of 5G technology is a much lower latency compared to LTE. However, to achieve the maximum benefit and lowest latency experience possible, it is important for the workload to be processed efficiently between the device, edge, and cloud. Currently, most use cases are limited by device capabilities and response delay from cloud-based solutions due to network latency between the edge, and the cloud where the processing is performed.

Yet a further challenge that may be addressed by some embodiments concerns the difficulty in mixing and matching smart media services provided by different respective vendors. Traditionally, telco operators have provided services to their consumers through proprietary and closed solution stacks. This approach makes it difficult or impossible for a user to pick and choose offerings from different vendors according to the needs of the user. With the industry moving towards more open specifications, users will benefit from the ability to choose from different vendor service offerings without having to deal with interoperability and performance issues, and without requiring service-specific hardware and system configurations.

A final example of challenges that may be resolved by one or more embodiments concerns the difficulty for individual contributors to benefit in smart service development and deployment. Particularly, smart services are often embedded into physical devices that require certain hardware knowledge to build, and connections to manufacture. This is a major block for those who know how to develop smart services but lack a hardware development and implementation background, which is very common in the software engineering and data science domains.

C. Aspects of Some Example Embodiments

With attention now to FIG. 1, details are provided concerning aspects of an example architecture 100. In the illustrated example, one or more input devices 102, such as video cameras for example, may be configured to gather data 102a at a user site, such as the home or business of a user for example, and transmit the gathered data 102a to a central point 104 such as a switch or router. In some instances, one or more of the input devices 102 may comprise an Internet of Things (loT) device such as a sensor configured to detect and report on physical and other phenomena disclosed herein. Thus, the input devices 102 may be considered as data gatherers in some embodiments. The data may be communicated by the input devices 102 to the central point 104 in any suitable way including, for example, D2D 5G communication, or Ethernet. As discussed in more detail below, the data may processed by an orchestrator 103 of an MEC platform 105, such as may be located at the user site 110, according to one or more pipelines 106 and 108 implemented at the user site 110, which may be a private location such as a school or home for example that comprises a private network. The pipelines 106 and 108 may be configured by the orchestrator 103 and/or a user such as IT personnel, to specify and/or include various smart services 112 and 114 which, along with corresponding upgrades, may be obtained by a user, such as an administrator, from a cloud market place 116. The services included in a pipeline may be specified by a user at the user site 110. The orchestrator 103 may then perform, or direct the performance of, the services of the pipelines 106 and 108 to generate outputs 117 that may be processed by output devices 118, and outputs 120 that may be processed by, for example, a cloud application 122. Thus, output devices 118 may be considered as data consumers. In the example of FIG. 1, the output device 118 may comprise an alarm, such as an accident alarm or intruder alarm, sounding locally at the user site 110. Additionally, or alternatively, the output 120 may be streamed from the user site 110 to the cloud application 122 at a public site 124 which may be an element of a cloud infrastructure. For example, if the processing of the data by the pipeline services reveals that one or more students are not wearing a protective mask, that output 120 may be transmitted to, and processed by, a cloud application 122 to generate information 126 accessible by a user device that may include an app or web browser configured to present the received output 120 to one or more users. Finally, any or all of the input devices 102, central point 104, output devices 118, and MEC platform, or simply 'MEC,' may take the form of respective edge sites of a network and may have data storage and processing capabilities.

With continued reference to the example of FIG. 1, a single provider may provide the software, cloud platform, hardware including an MEC with accelerator, 5G network equipment and automation. An example of such an offering can include an all-in-one 5G MEC appliance, cloud services, and software-defined edge and cloud platforms. Other arrangements and offerings may be possible as well.

With the foregoing summary in view, further details are now provided concerning various aspects of some example embodiments. In general, example embodiments may provide a home, or other private, 5G D2D and MEC platform, as well as a cloud marketplace 116 that can offer smart media services at home and private institutions such as the user site 110.

At least some embodiments may include a Cloud Marketplace 116 where contributors, such as developers for example, can share their smart services 114 and users can purchase/download the smart service 114. Such embodiments may further comprise an orchestrator 103 that is, or comprises, an MEC platform 105 that can discover devices, such as input devices 102, in the private network, download the smart services 112 and 114 from the cloud marketplace 116 and deploy those smart services 112 and 114 in one or more pipelines, such as pipelines 106 and/or 108 for example.

In some embodiments, a containerized approach may be employed in which a container is used as a deployment unit for deployment of a smart service. Embodiments of the invention may also be applied to execution of the smart services by one or more virtual machines (VM), although that is not necessarily required. As well, with suitable machine level orchestration by the orchestrator 103, the workload, that is the smart services 112 and 114, can also be executed on bare-metal machines (BMM) instead of on virtual machines.

In some embodiments, an example operating environment may comprise various elements which may be employed in connection with operations of such embodiments. Thus, for example, an operating environment may comprise one or more input devices 102, such as cameras, monitors, and sensors. In general, an 'input device' may be any device capable of operations such as, but not limited to, gathering, storing, processing, transmitting, and/or generating, data and/or metadata. Input devices may operate in connection with audio data, video data, audio/video data, and any data relating to conditions in a physical environment such as, but not limited to, light, heat, sound, particulates, humidity, vibration, odor, pressure, temperature, velocity, and acceleration.

An example operating environment may further comprise one or more output devices 118 such as, but not limited to, TV, alarms, smart phones, and cloud applications 124. As well, the user site 110 may comprise a home network, or other private network, configured, for example, to the 5G and/or WiFi standards. The MEC 105 may be installed as well. Finally, the input devices 102, output devices 118, central point 104, and MEC 105 may all be connected to the same network. Given this example configuration of an operating environment, attention is directed next to aspects of some example workflows involving the operating environment.

An example workflow may include, or possibly begin with, a smart service registration process. Particularly, in order to put a service, such as services 114 for example, on the cloud marketplace 116, the service must follow some certain criteria on the format of input, such as from an input device 102, and output, such as from an output device 118. For example, a service 'A' may claim that it can consume a video stream from an input device 102 as input and return a value to indicate whether there is fire or smoke present in the input. By following the format defined by the cloud marketplace 116, another alarming service 'B' may be integrated with, and triggered by, the output of smart service 'A.' Thus, when 'A' returns a positive result or value indicating the presence of smoke/fire in input received from the input device 102, the smart service 'B' may be triggered automatically to sound an alarm.

An example workflow may also include a device configuration process. During device configuration, the input devices 102 and output devices 118 may be registered to the orchestrator 103 so that the orchestrator 103 will know what type of functionalities the device provides, such as what type of data the device can consume as an output device, or whether the device provides input multiple other devices/services as an input device, such as a sensor device.

Device configuration may be based in part on the type of network in which the device is expected to operate. For example, a spectrum control process may be performed on a device that will be operating in a 5G network, or the device may be configured with IP routing if the device will be operating in a WiFi environment. Furthermore, the device configuration process may be either manual or automated, based on auto-discovery on a pre-defined broadcast channel with pre-defined metadata format. For example, the metadata format may be determined by an industrial standard. A simple list of metadata tags may be sufficient for a simple design, such as "security-camera," "TV," and "4K," to name a few examples. After the input devices 102 and output devices 118 have been configured, the orchestrator 103 may be aware of, and able to communicate with, the input devices 102 and output devices 118, and may also be aware of the capabilities and characteristics of those devices. The predefined metadata format and metadata tags may also indicate whether, and to what extent, two different smart services 112 and/or 114 may be integrated together. For example, if smart service 'A' can deliver pictures as output, and smart service 'B' can only accept an audio stream as an input, then the output of smart service 'A' could not serve as an input to smart service 'B.' That is, smart service 'A' may not be able to be followed by smart service 'B' in the pipeline 106 or 108.

After registration and configuration of the input devices and output devices have taken place, one or more smart services may then be deployed. For example, when a software vendor has finished development of smart media services, the execution images for the smart media service may be published in the cloud marketplace 116. The execution image may contain runtime executables, such as container images, AI models and parameters, configurations, as well as metadata that describes the services to the user so as to enable the user to decide whether or not the service should be purchased. The user may browse, using a web interface, mobile phone app, or other type of interface, the smart services 114, which may include smart media services, from the cloud marketplace 116 and decide which functionality they want to implement in one or more pipelines, such as pipelines 106 and 108 for example.

After the user has selected one or more smart services 114, the selected services 114 may then be downloaded to the user site 110 to be executed in the MEC 105 according to the defined pipelines 106 and 108. The execution environment for the smart services 114, and hardware access to the input devices 102 and output devices 118, may be standardized. For example, the execution environment may comprise a container execution environment with GPU (Graphics Processing Unit) access via CUDA, where CUDA refers to the parallel computing platform and programming model developed by Nvidia for general computing on GPUs.

In some embodiments, the cloud marketplace 116 may issue a warning if a user attempts to purchase a service that is not compatible with other services and/or devices of the user. The user may maintain a profile at the cloud marketplace 116 and/or elsewhere that includes information about the services and devices in the user system. In this way, the cloud marketplace 116 may issue warnings, and recommendations, regarding services that are not, or are, compatible with the configuration of that user. The cloud marketplace 116 may also notify the user when new smart media services become available that, based on the known user configuration, the user may be interested in. As also indicated in FIG. 1, the cloud marketplace 116 may push, or may have pulled from it by a user, smart service updates to the user site 110 for inclusion in one or more of the pipelines 112 and 114. As another example, when new versions of services are available in the marketplace, it can be automatically downloaded and deployed in the MEC 105 through blue-green deployment or other continuous delivery mechanism.

As well, a user may mix and match devices and services from different hardware and service vendors as needed to suit the requirements of the user. Further, the user may can set different SLAs (Service Level Agreements) through policies for different services. For example, latency requirements may be very different for a baby monitor detecting and responding to a baby choking, as compared with providing the user the ability to see additional metadata related to media content such as, for example, actors or movie trivia. Such use of SLAs, or other mechanisms for specifying user requirements, may enable embodiments to efficiently provision and utilize resources across different smart service workloads.

After the smart media services have been downloaded from the cloud marketplace, the user may use the orchestrator 103 to configure the service execution pipeline(s), sometimes referred to herein simply as a 'pipeline,' so that, with reference to the example of FIG. 1, the input data stream 102a from the input devices 102 can be passed through services 112/114 in the pipeline 106/108 and the output will be transmitted to the output devices 118 and/or cloud application(s) 122, for example.

For a more automated user experience, and with reference to the example of FIG. 1, metadata tags may be applied to input devices 102 and output devices 118, either or both of which may comprise, for example, baby monitors, indoor cameras, outdoor cameras, surveillance cameras, microphones, TV input, or streaming devices. Metadata tags may additionally, or alternatively, be applied to data streams generated by input devices 102. One or more pipelines, such as pipelines 106 and 108, may be automatically configured, based on the metadata tags, with little or no user involvement. In some embodiments, a list of user-selectable pipeline configurations may be presented to the user, and any selected pipelines then created and deployed. The smart media services in the pipelines 106 and 108 may then utilize input and output devices without vendor-locking, based on standardization. That is, the user can run the smart media services without having to have vendor-specific hardware such as input devices 102 and output devices 118. Because the hardware may be standardized, rather than tied to a particular vendor, the user may be able to implement a suite of customized, and compatible, smart media services specifically geared to the hardware and needs of the user.

When the service pipelines, which may also be referred to simply as a 'pipeline' or 'execution pipeline,' have been configured, the data from the input devices 102 may then be processed. Initially, an input media stream, such as from an input device 102, may be ingested into the MEC 105 by way of a user network at the user site 110. If the user network is configured for 5G, the ingestion may be by way of a D2D connection between the input device 102 and the user network, so that local bandwidth is not impacted. If the user network is IP-based, for example, the data from the input devices 102 may be received by way of a central point 104 such as a switch or router for example.

After the input data stream from the one or more input device(s) 102 is transmitted to the MEC 105, the data stream may then be processed through the services 112 and 114 configured in each pipeline 106 and 108. Each service in a pipeline, such as the services 112 and 114 in pipelines 106 and 108 for example, may have a specific functionality that triggers corresponding output devices, such as output device 118 and cloud application 122.

In some embodiments, the MEC 105 may offer a scalable execution environment with sufficient hardware sharing, such as GPU sharing for example, among workloads imposed by the services in the pipelines. Depending upon the pipeline configurations, the services of the pipelines may be executed in sequence, or in parallel. In the event that the local MEC 105, which may be an edge element such as an edge station, may lack adequate computing capacity, an edge-bursting approach can be used to burst into another edge station for intelligent resource consumption purpose.

After the services, such as services 112 and 114, have processed the data received from the input devices, one or more of the services can trigger different responses in an output device, and/or perform other modifications, one example of which is to modify the input data stream. To illustrate, a service that receives a broadcast stream from an input device such as a computer or streaming service may filter out inappropriate images and language from the broadcast stream before passing the stream to a local TV for display. As another example, if an input device 102 such as a video camera or heat/smoke detector detects a fire, a safety service included in a pipeline may evaluate the data from the input device 102 and transmit a signal which activates a sprinkling system to put out the fire.

In some embodiments, one or more services may be auto scaled to handle additional input traffic from the input devices. Auto-scaling may involve, for example, prioritizing some input traffic over other traffic, offloading processing to other instances of the service running elsewhere, and/or bringing online one or more VMs running respective instances of the service. As well, when an input device is turned off, disabled, or removed from service, the smart media services and/or other services that operate on data received from that input device may also detect that change and be turned off, possibly automatically, for intelligent resource consumption.

D. Example Methods

Figure 2:
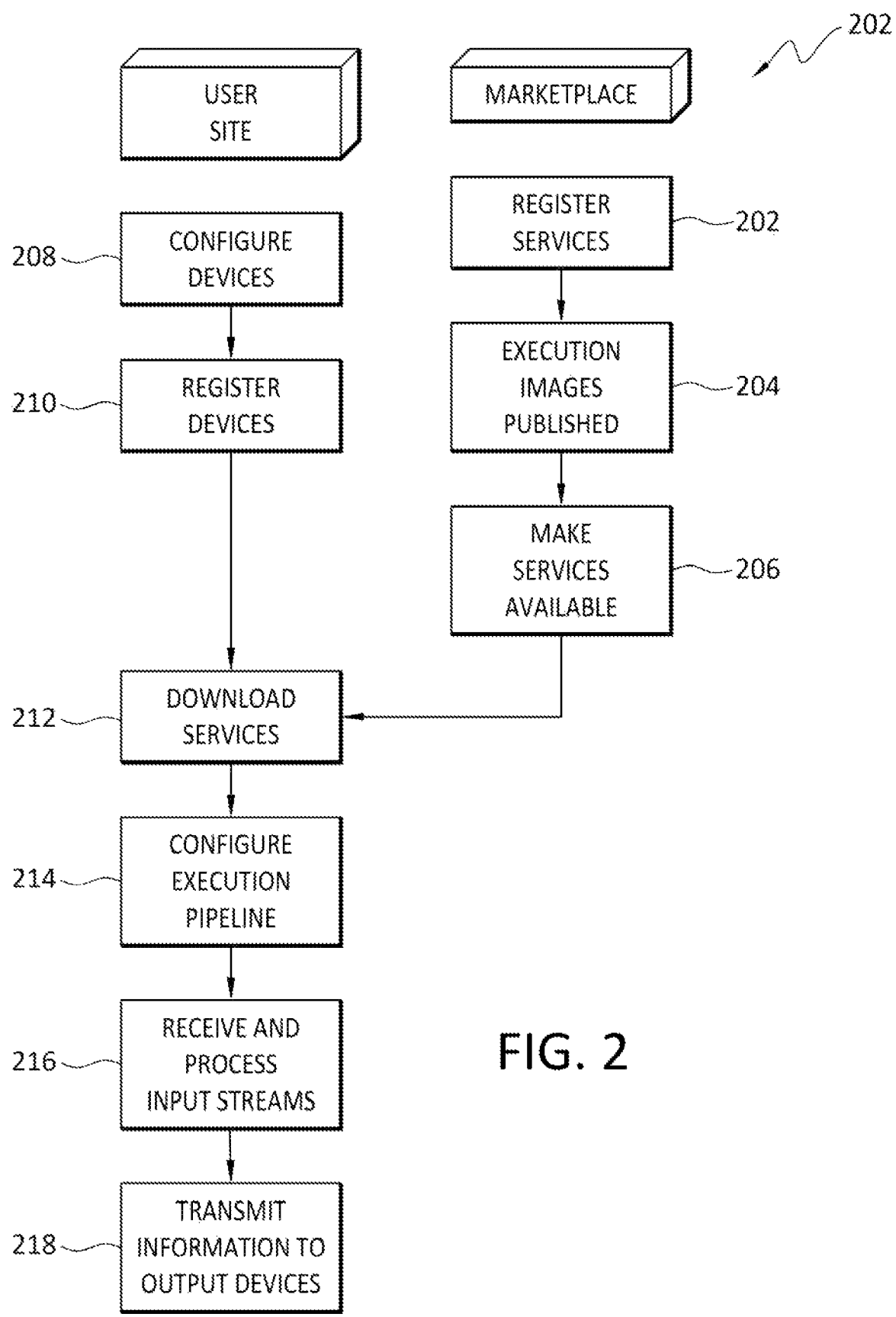
FIG. 2 discloses aspects of some example methods.

It is noted with respect to the example method 200 of FIG. 2 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 2, example methods are disclosed for implementing various aspects of embodiments of the invention, where one such method is denoted generally at 200. Depending upon the implementation, aspects of the method 200 may be performed in parallel, or in series, although no particular order of the performance of the processes disclosed herein is necessarily required.

The method 200 may begin when, for example, one or more services, which may include smart media services, is registered 202 at a marketplace, such as a cloud marketplace for example. Upon successful registration 202, respective execution images for the services may be published 204 to the cloud marketplace, and the services then made available 206 for download by users. Note that the processes 202-206 may be performed continuously, or ad hoc, as new services, and updates to existing services, come online.

Before, during, or after, performance of the processes 202-206, one or more user input devices and/or output devices may be configured 208 at a user site, such as a private home network or school network for example. The configured devices may then be registered 210, such as at an orchestrator associated with the user site.

One or more services may then be downloaded 212 to the user site from the marketplace. The services may be compatible with the registered devices and may reflect the particular needs of the user with respect to the processing of data generated by the input devices associated with the user site.

After the services have been downloaded 212, one or more execution pipelines may be configured 214 and deployed. In general, the execution pipelines may, among other things, specify an order in which the downloaded services are to be performed, and may be configured to accommodate relationships between and among the services in the execution pipeline so that the services are performed in a logically consistent and effective manner. The pipelines may be configured 214, for example, using a wizard or other approach which may help to ensure such logical consistency and effectiveness. To illustrate, a wizard may warn a user that one of the selected services is not interoperable with another of the selected service, and/or the wizard may suggest one or more services to a user based on historical data and compatibility information.

After the execution pipelines have been configured 214 and deployed, one or more data streams from an input device may be received 216 at the user site and processed according to the requirements of the applicable pipeline(s). Such processing may include, but is not limited to, modification of the received data stream, and/or, triggering an output device to perform a particular action based on analysis of the data stream performed by one or more of the pipeline services.

Finally, after performance of the pipeline services 216, the orchestrator and/or other entities at the user site may transmit 218 information relating to the processing that has been performed. In some instances, the information may take the form of a modified input data stream transmitted to a TV for example, or a signal that triggers an output device to perform a particular action.

E. Further Aspects of Some Example Embodiments

As will be apparent from this disclosure, example embodiments may, but need not necessarily, include various useful and advantageous aspects, examples of which are noted below and elsewhere herein. For example, some embodiments may implement a smart media service pipeline. This configurable service pipeline may provider services required for smart media use cases. As well, the service pipeline may enable users to combine relevant services together to define specific SLAs through an easy to use configuration tool. As another example, some embodiments may provide for a smart media service mesh that spans multiple service vendors. In this way, users may choose services across different vendors and use an underlying service mesh to manage the end-to-end workflow and communication between services. Further, some embodiments may provide a smart media service marketplace that may enable users to select the media services they need for their specific use cases. The service marketplace may also provide recommendations based on predefined parameters and use case specific requirements. As another example, some embodiments may provide a smart media service pipeline with 5G D2D connections. This configuration may allow input devices and output devices to directly connect with a private 5G MEC through 5G D2D connection, through configuration both by manual and automated discovery. Further, some embodiments may provide MEC hardware sharing and auto-scalability. This approach may allow media services to achieve resource sharing and computation-load balancing within the multiple clusters of the MEC platform. Some embodiments may provide for edge-bursting for some smart media use cases. For example, when a private MEC does not have enough computing capacity to execute all pipeline services, smart media services may be routed to be executed in another edge station close by. In some embodiments, smart media customization may be based on personal preference. For example, instead of streaming pre-rendered content from the cloud, some embodiments may provide mechanisms for smart media customization, such as by modifying an input device data stream at a reception point of a user site, through edge computation powered by MEC hardware and marketplace software. As another example, some embodiments may provide for stream modification or notification output based on services. Such embodiments may involve a mechanism for software services to modify streaming content or trigger output devices, such as an alarm. Further, some embodiments may provide an automated smart media service pipeline configuration based on metadata on input and output devices. That is, such embodiments may implement device discovery and automated configuration of service pipelines through metadata on devices. As a further example, some embodiments may implement sequential smart media processing that may combine multiple services from different vendors to accomplish difficult use cases. Configuring pipelines of services may enable sequential processing and modification of media stream, so that services can process outcomes of other services, enabling groups of services to work together and accomplish greater outcome collaboratively. In a final example, some embodiments may provide automated upgrade of smart media devices and services. For example, when new features and improved user experience are made, the cloud marketplace can provide automated upgrade to services running MEC without requiring users to purchase new versions of hardware or manually installing and configuring software.

F. Some Illustrative Use Cases

Following are some illustrative use cases which demonstrate how some example implementations of the invention may behave. These particular examples include possible smart media pipeline configurations. The various services involved may be developed by different service vendors.

The first example pipeline may concern baby monitoring, and may be configured as shown below.

Pipeline 1: Baby Monitoring
1. Input: Baby monitor
2. Services:
   a. Video detection for baby choking
      i. Output: Home Alarm
   b. Video recognition for whether baby is sleep or aware
      i. Output: Baby Health Application on cloud to document baby health telemetry
   c. Crying sound detection and emotional recognition
      i. Classify intent: diaper change, hunger, boredom
      ii. Output: Parental notification on smart phone A second example pipeline may concern home entertainment, and may be configured as shown below.

Pipeline 2: Home Entertainment
1. Input: TV or Streaming devices
2. Services:
   a. False news detection
      i. Classify false news and modify video to put label on screen (maybe even provide actual facts)
   b. Inappropriate content detection
      i. Cover up nudity
      ii. Beep out adult language
      iii. Notify parents
   c. Actor or video background information and fun facts
      i. Small caption below
   d. GAN (Generative Adversarial Network) for costume customization
      i. When I'm watching Spiderman, I want to see Spiderman wearing the black costume (or wearing the nano-suit)
   e. GAN for facial customization
      i. When I'm watching Friends, I want to see Rachel with a mustache on every episode (or a face-swap between Cox and Aniston, so Cox is Rachel and Aniston is Monica)
   f. GAN for visual customization
      i. When I'm watching Game of Thrones, I want to see the ghost of Ned Stack following Joffrey in every scene (or just Jon Snow being taller).
      ii. When watching horror movies, horrible creatures can be replaced with happy faces when children are around
3. Output: TV A third example pipeline may concern a security system, and may be configured as shown below.

Pipeline 3: Security system for home or school
1. Input: Security cameras
2. Services:
   a. Intruder detection (services can be configured according to school/visitor facial image database)
   b. Gun/Weapon video recognition
   c. Violence/Bullying detection
   d. Accident (Falling/Laying on ground) detection
   e. Health Safety detection (not wearing a face mask)
      i. Germ transmission alert—children sneezing on or touching one-another?
3. Output: Notification on alarm or phones

G. Further Example Embodiments

Following are some further example embodiments of the invention. These are presented only by way of example and are not intended to limit the scope of the invention in any way.

Embodiment 1. A method, comprising: configuring an input device based in part on a type of network with which the input device is expected to be used; configuring an output device based in part on a type of network with which the output device is expected to be used; registering the input device and the output device with an orchestrator; downloading a service needed to process a data stream generated by the input device; configuring an execution pipeline, and the execution pipeline includes the service; receiving the data stream from the input device and processing the data stream with the execution pipeline; and transmitting information relating to the processed data stream to the output device.

Embodiment 2. The method as recited in embodiment 1, wherein the service is downloaded from a cloud marketplace.

Embodiment 3. The method as recited in any of embodiments 1-2, wherein the input device comprises a sensor or a video camera.

Embodiment 4. The method as recited in any of embodiments 1-3, wherein the output device comprises a TV, alarm, smart phone, or cloud application.

Embodiment 5. The method as recited in any of embodiments 1-4, further comprising checking interoperability of the service with another service before adding the another service to the execution pipeline.

Embodiment 6. The method as recited in any of embodiments 1-5, further comprising applying a metadata tag to the input device.

Embodiment 7. The method as recited in any of embodiments 1-6, wherein the method is performed at a user site.

Embodiment 8. The method as recited in any of embodiments 1-7, further comprising scaling the service in response to changes in an amount of data received by the execution pipeline.

Embodiment 9. The method as recited in any of embodiments 1-8, wherein processing the data stream comprises modifying the data stream and outputting the modified data stream to the output device.

Embodiment 10. The method as recited in any of embodiments 1-9, wherein processing the data stream comprises analyzing content of the data stream and, based on the analyzing, outputting a signal to the output device, and the signal is based on the analyzing.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
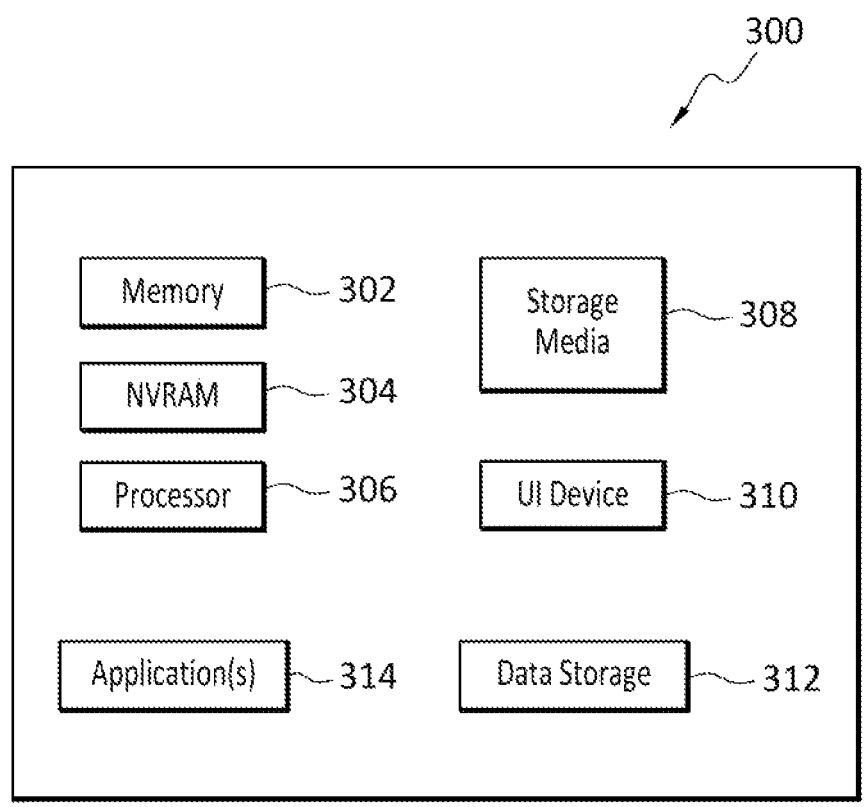
FIG. 3 discloses aspects of an example computing entity configured to perform any of the methods and processes disclosed herein.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    configuring an input device based in part on a type of network with which the input device is expected to be used;
    configuring an output device based in part on a type of network with which the output device is expected to be used;
    registering the input device and the output device with an orchestrator that is operable to discover and download services from a cloud marketplace;
    downloading, by the orchestrator, a service needed to process a data stream generated by the input device;
    configuring an execution pipeline, wherein the execution pipeline includes the service, and the execution pipeline specifies an order in which the service will be performed, relative to any other services in the execution pipeline;
    receiving, by the execution pipeline, the data stream from the input device and processing the data stream with the execution pipeline; and
    transmitting, by the orchestrator, information relating to the processed data stream to the output device.

2. The method as recited in claim 1, wherein the service is downloaded from the cloud marketplace.

3. The method as recited in claim 1, wherein the input device comprises a sensor or a video camera.

4. The method as recited in claim 1, wherein the output device comprises a TV, alarm, smart phone, or cloud application.

5. The method as recited in claim 1, further comprising checking interoperability of the service with another service before adding the another service to the execution pipeline.

6. The method as recited in claim 1, further comprising applying a metadata tag to the input device.

7. The method as recited in claim 1, wherein the method is performed at a user site.

8. The method as recited in claim 1, further comprising scaling the service in response to changes in an amount of data received by the execution pipeline.

9. The method as recited in claim 1, wherein processing the data stream comprises modifying the data stream and outputting the modified data stream to the output device.

10. The method as recited in claim 1, wherein processing the data stream comprises analyzing content of the data stream and, based on the analyzing, outputting a signal to the output device, and the signal is based on the analyzing.

11. A non-transitory storage medium having stored therein instructions that are executable by one or more hardware processors to perform operations comprising:
    configuring an input device based in part on a type of network with which the input device is expected to be used;
    configuring an output device based in part on a type of network with which the output device is expected to be used;
    registering the input device and the output device with an orchestrator that is operable to discover and download services from a cloud marketplace;
    downloading, by the orchestrator, a service needed to process a data stream generated by the input device;
    configuring an execution pipeline, wherein the execution pipeline includes the service, and the execution pipeline specifies an order in which the service will be performed, relative to any other services in the execution pipeline;
    receiving, by the execution pipeline, the data stream from the input device and processing the data stream with the execution pipeline; and
    transmitting, by the orchestrator, information relating to the processed data stream to the output device.

12. The non-transitory storage medium as recited in claim 11, wherein the service is downloaded from the cloud marketplace.

13. The non-transitory storage medium as recited in claim 11, wherein the input device comprises a sensor or a video camera.

14. The non-transitory storage medium as recited in claim 11, wherein the output device comprises a TV, alarm, smart phone, or cloud application.

15. The non-transitory storage medium as recited in claim 11, further comprising checking interoperability of the service with another service before adding the another service to the execution pipeline.

16. The non-transitory storage medium as recited in claim 11, further comprising applying a metadata tag to the input device.

17. The non-transitory storage medium as recited in claim 11, wherein the non-transitory storage medium is performed at a user site.

18. The non-transitory storage medium as recited in claim 11, further comprising scaling the service in response to changes in an amount of data received by the execution pipeline.

19. The non-transitory storage medium as recited in claim 11, wherein processing the data stream comprises modifying the data stream and outputting the modified data stream to the output device.

20. The non-transitory storage medium as recited in claim 11, wherein processing the data stream comprises analyzing content of the data stream and, based on the analyzing, outputting a signal to the output device, and the signal is based on the analyzing.

* * * * *